United States Patent [19]

Kyu

[11] Patent Number: 5,049,619

[45] Date of Patent: Sep. 17, 1991

[54] POLYMERIC ALLOYS

[75] Inventor: Thein Kyu, Akron, Ohio

[73] Assignee: Edison Polymer Innovation Corporation, Broadview Heights, Ohio

[21] Appl. No.: 337,893

[22] Filed: Apr. 14, 1989

[51] Int. Cl.$^5$ .................... C08L 69/00; C08L 33/12
[52] U.S. Cl. ................................ 525/148; 525/146; 525/425; 523/340
[58] Field of Search ................ 525/146, 148; 523/340

[56] References Cited

U.S. PATENT DOCUMENTS

| | | | |
|---|---|---|---|
| 4,336,348 | 6/1982 | Margotte | 525/148 |
| 4,461,868 | 7/1984 | Lindner et al. | 525/67 |
| 4,594,371 | 6/1986 | Nauman | 525/133 |
| 4,745,029 | 5/1988 | Kambour | 525/148 |
| 4,749,749 | 6/1988 | Munzer | 525/148 |
| 4,753,654 | 5/1988 | Kyu et al. | 525/148 |
| 4,987,188 | 1/1991 | Furno | 525/928 |

OTHER PUBLICATIONS

Kyu, "Kinetics of Phase Separation by Spinodal Decomposition in PC/PMMA Blends" Polymer Preprints, Aug. 1987, vol. 28, No. 2.

Nakai, "Spinodal Decomposition of Polymer Mixtures with a Thermotropic LCP As One Component" Macromolecules 1986, 19, p. 3008.

"Phase Separation by Spinodal Decomposition in Polycarbonate/Poly (Methyl Methacrylate) Blends", Macromolecules, 1988, 21, pp. 1021/1026, Author: Thein Kyu and Jeanne M. Saldanha.

Primary Examiner—John Bleutge
Assistant Examiner—David Buttner
Attorney, Agent, or Firm—D. Peter Hochberg; Mark Kusner; Louis J. Weisz

[57] ABSTRACT

Two-component polymeric compositions having two interconnected solid phases, and exhibiting spinodal decomposition morphology at the domain boundaries are shown, as are methods for forming the same. The compositions are prepared from two different polymers one of which possesses ductility in that it shows substantial yield behavior under tensile stressing, the other being brittle, exhibiting no such behavior; thermoplastic polymers, in conjunction with thermotropic liquid crystalline materials, exemplify such systems. The desired morphology is created by preparing the two component compositions in a single solid phase below the lower critical solution temperature of the compositions, and thereafter heating the compositions above such temperature to form a two-phase system. After a predetermined period of time at the upper temperature, during which spinodal decomposition spontaneously occurs, stabilization of the spinodal morphology is achieved by lowering the temperature of the compositions below the lower of its two glass transition temperatures.

6 Claims, 5 Drawing Sheets

POLYMERIC ALLOYS

TECHNICAL FIELD

This invention relates to substantially homogeneous compositions of polymeric materials that possess superior physical characteristics. More particularly, this invention relates to a method for preparing substantially homogeneous solid compositions from combinations of brittle polymers, together with ductile polymers, such compositions exhibiting spinodal morphologies. Specifically, this invention relates to a method for preparing substantially homogeneous polymer compositions, "polymer alloys", in a solid, single phase form, and thereafter increasing the temperature of the compositions above their lower critical solution temperature to form two-phase systems exhibiting interconnected spinodal structures. The macro structures of the compositions are thereafter stabilized in their spinodal form by lowering the composition temperatures below the lower of their two glass transition temperatures.

BACKGROUND OF THE INVENTION

High modulus plastics which also exhibit superior toughness, possess good impact resistance, allowing them to accept sudden blows and shocks without being fractured, or suffering substantial physical damage. Such materials, frequently referred to as engineering, or high-impact plastics, have broad applications in the formation of articles that are expected to be subjected to abrupt, extreme stress during use.

In the past, a variety of "toughened" plastics have been prepared and used for high-stress applications. These include materials such as high impact polystyrene, "ABS", and terpolymers of acrylonitrile-butadiene-styrene. In such polymers, soft, rubbery segments are polymerized in block sequences, or grafted onto polymer backbone chains. Typically, the rubbery domains are microphases separated from the glassy matrix constituting the balance of the material. When such polymers are subjected to external forces, energy absorbing crazes develop at the boundaries of the rubbery domains, making possible the toughness exhibited by the materials.

Polymer mixtures with improved impact characteristics have also been prepared. For example, acrylonitrile-styrene co-polymers have been incorporated with polycarbonates, the former being brittle polymers, and the latter ductile substances. Polycarbonates have also been incorporated with polymethylmethacrylate, another brittle polymer. In both instances, improvements in toughness have been attributed to the development of stress-created crazing at the peripheries of the brittle domains, the process of craze formation absorbing stress energy, and preventing significant damage to the material. While such absorption is accomplished in a relatively non-destructive fashion, clearly, there is a finite limit to the amount of stress that can be accommodated by craze formation.

A different approach, the one contemplated by the invention disclosed herein, involves the preparation of discrete polymeric molecular entities as a single composition, which however, entails separate solid phases with interconnected spinodal structure in the area of the phase boundaries. Such interconnected structure, sometimes termed modulated structure, has been discovered to exert a profound affect on the mechanical performance of the polymers exhibiting such morphology, particularly the toughness of such polymers.

DISCLOSURE OF THE INVENTION

In view of the preceding, therefore, it is a first aspect of this invention to provide polymer compositions that possess superior high impact strength.

A second aspect of this invention is to provide polymer compositions that achieve impact resistance through controlled spinodal decomposition.

Another aspect of this invention is to provide blends of polymers existing as separate solid phases characterized by having interconnected, modulated, structural features at the peripheries of the solid phase boundaries.

A further aspect of this invention is to furnish polymer alloys which provide a greater area, being proportional to their toughness, within the parameters of the stress-strain diagram reflecting tensile testing of the alloys.

An additional aspect of this invention is to provide a method by which a two-phase interconnected spinodal structure can be introduced into polymer alloys, and significantly stabilized therein.

A still further aspect of this invention is provided by a method by which the nature and extent of solid, two-phase, interconnected spinodal structures of polymeric compositions can be controlled at a desired point.

Yet another aspect of this invention is to provide polymer alloys in which individual phase domains are relatively uniform, finally divided, substantially uniformly dispersed, and which display good interphase connection, favoring toughness enhancement.

The foregoing and additional aspects of the invention are provided by a process for producing two-phase, solid, polymeric alloy compositions from blends of two different polymers, present in relative amounts other than those amounts in which said polymers form a single phase at all temperatures above their glass transition temperature, and characterized by interconnected structural morphology dependent upon spinodal decomposition comprising:

preparing a polymeric composition exhibiting a single phase, and having a single glass transition temperature, from a combination of said polymers;

heating said single phase composition at least to a first temperature, above its glass transition temperature, so as to form interconnected two-phase material having two glass transition temperatures; and thereafter substantially stabilizing the two-phase morphology of said two-phase material by lowering its temperature to a second temperature, below the lower of its two glass transition temperatures.

The foregoing and other aspects of the invention are provided by a polymeric alloy composition prepared by the process described in the preceding paragraph.

The foregoing and further aspects of the invention are furnished by a polymeric alloy composition comprising a composition of a ductile polymeric material exhibiting substantial yield behavior prior to its point of ultimate elongation, in combination with a brittle polymeric material not exhibiting such behavior, characterized in that each of said polymers comprises a separate solid phase interconnected by spinodal structure, said composition exhibiting two glass transition temperatures.

BRIEF DESCRIPTION OF THE DRAWINGS

The invention will be better understood when reference is had to the following drawings in which.

DETAILED DESCRIPTION OF THE INVENTION

Figure 1:
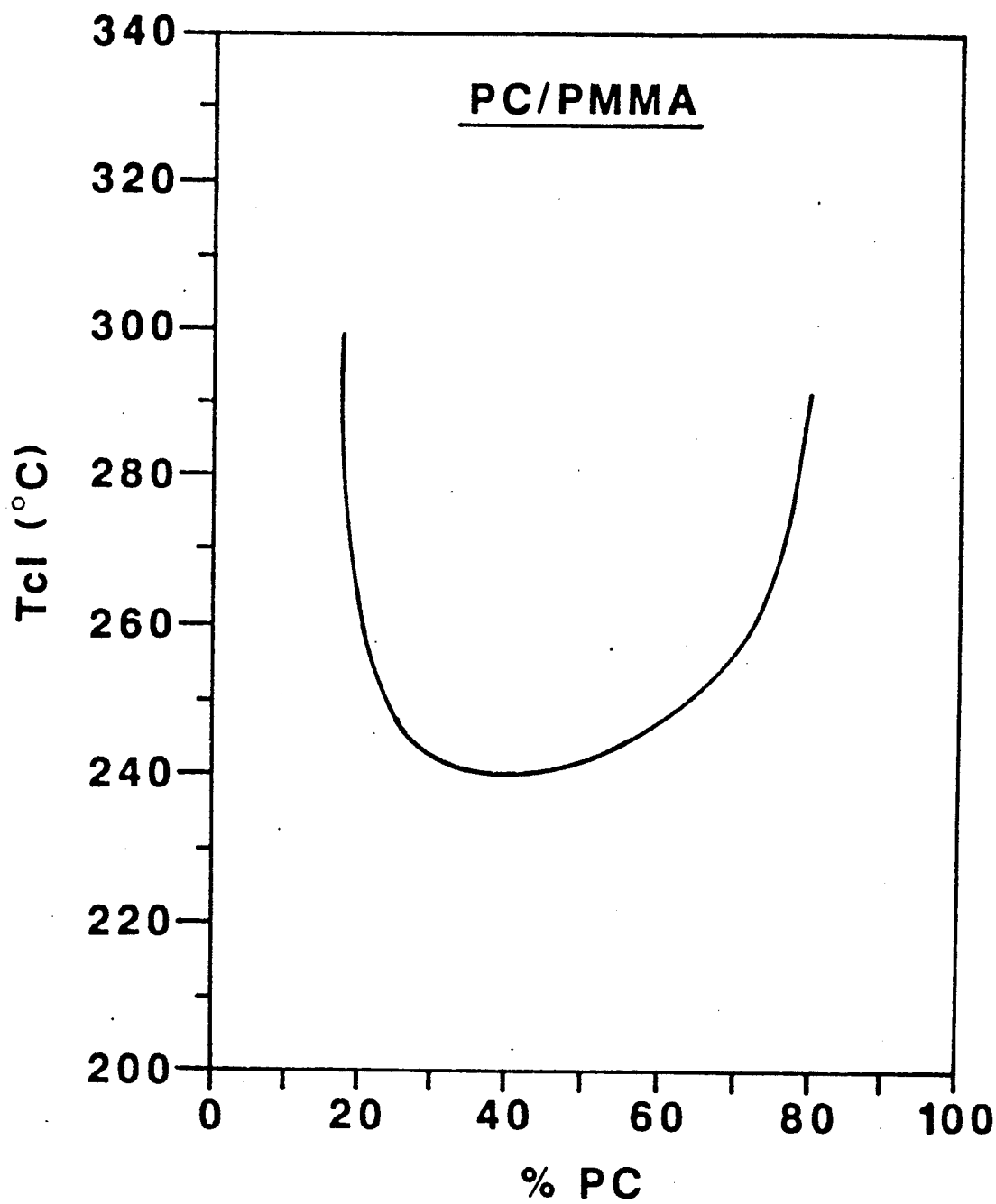
FIG. 1 shows a phase diagram for a polycarbonate/polymethylmethacrylate composition, obtained by plotting cloud points arrived at by heating system compositions at the rate of 2° C. per minute.

The basis of the invention described herein is the observation that it is possible to prepare two-component molecular composites in single phase form, and thereafter to manipulate the composites by means of thermal treatment to form two discrete phases. Subsequently, the spontaneously-occurring spinodal decomposition is allowed to proceed far enough to produce a desired domain size with interconnecting network boundary structure of a type resulting in superior mechanical performance of the composition, particularly toughness, at which point the decomposition is arrested.

While not wishing to be bound by the theory it is speculated that the interconnecting network structure formed at the phase boundaries in compositions of the invention provides sufficient molecular mobility to allow the polymers to make necessary molecular positional adjustments when subjected to mechanical stress, thus allowing them to absorb the energy of the stress without damage to the structural integrity of the polymers.

The preceding tends to suggest that the criteria for toughness improvement depends upon particle size, particle uniformity, homogeneity of particle dispersion, and the nature of the interfacial adhesion between the continuous and discontinuous phases of the system. In any event, it has been determined that the kinetics of domain propagation, that is, the increase in size of the domains with time during the spinodal decomposition process, plays an important role in the development of the superior two-component polymer compositions contemplated by the invention.

It has been found that a particular processing sequence should be followed in preparing the compositions contemplated by the invention. For example, it is necessary to initially prepare a two-component polymer composition in which the polymers are present as a single phase. In accomplishing this, and while other techniques may be employed, a useful procedure involves the solution of the two polymers in a mutual solvent. In the case of a polymer system which includes polycarbonate, PC, in conjunction with polymethylmethacrylate, PMMA, the polymers can be dissolved in solvents such as, for example, methylene chloride, tetrahydrofuran, or equivalent solvents. The resulting solution may then be treated by techniques such as spray drying, freeze drying, coagulation in non-solvent materials, film casting by means of solvent evaporation, or similar techniques. Films thus formed exhibit transparency, and a single glass transition temperature, verifying the single phase existence of the contained components.

Following formation of the two-component, single-phase system, the polymeric composition thus prepared is heated above its lower critical solution temperature, LCST, a temperature at which the single phase composition is transformed into a two-phase composition. The lower critical solution temperature, which is discussed in greater detail in the following, ranges from about 180° C. to about 300° C., in the case of of a PC/PMMA system.

While various methods of heating the single phase material above the LCST point may be employed, the heating technique is important for the reason that the compositions' heat history has an important bearing on the size of the phase domains, and therefore on the physical properties of the product composition. In this regard, the formation of the two-phase domains is a dynamic process in which finely divided and well-dispersed, domains are initially formed when the polymer composition is raised above its LCST temperature. However, as the residence time within such temperature region increases, the size of the domains increase as a result of component diffusion and surface tension effects. Beyond a certain size, the physical properties, notably the toughness of the polymeric compositions, undergo deterioration.

With respect to such phenomena, it has been found desirable to maintain the size of the domains at less than about two microns, and superior results are achieved when such domains are not permitted to exceed about one micron. The domain size will depend upon the nature of the polymers being combined, their molecular weights, and the extent to which the temperature of the polymer composition is raised, above its LCST, as well as on its residence time within such temperature region. Since the interrelationship is empirical in nature, simple experimentation determining optimal processing conditions for a particular system.

The spinodal decomposition referred to describes the phase separation experienced in an initially unstable system, associated with infinitesimal composition fluctuations. In its initial stages, it results in domains that are more or less uniform and finely dispersed, thus favorably influencing toughness of the resulting composition. As previously explained, the extent of the spinodal decomposition, and therefore the morphology of the product compositions can be adjusted by controlling composition temperatures, molecular weights, residence times in the region above the LCST temperature, and the other factors enumerated. This allows processing conditions to be selected so as to produce a polymeric product with the physical characteristics required for a particular application. The nature of the interdiffusion occurring during spinodal decomposition apparently gives rise to interphase networks which beneficially affect the interfacial properties at the phase bounderies, conferring the benefits achieved by the compositions of the invention.

After the polymer composition has been heated to the point desired above its lower critical solution temperature, and maintained at that point until the desired domain structure has been achieved, the morphology of the system is stabilized by reducing the temperature of the composition below the lower of the two glass transition temperatures exhibited by the two-phase system.

Commonly such stabilization is carried out by processing the material into the ultimate product form required, for example, by injection molding. Alternatively, the polymeric composition may be quenched below its LCST, and retained for subsequent fabrication at a temperature above the system's glass transition temperature at a later time.

While the reference has been made in the preceding to the lower critical solution temperature, and while the systems described more particularly in the following, exhibit such temperatures, as used herein, the term actually refers to a "quasi" LCST, since on the basis of thermodynamic considerations, one would expect to observe the reappearance of a single phase upon cooling below the LCST. While some phase transition is observed, particularly in the case of lower molecular weight materials, the reversibility of phase separation appears to be limited as the result of the stabilization phenomenon referred to.

The preparation of a true equilibrium phase diagram is impractical because of the important influence of the kinetics of the heating process on the nature of the resulting diagram. In this regard, and with respect to a particular system, cloud point measurements are prepared by heating the systems from a lower temperature up through a higher temperature. At some such latter temperature, turbidity occurs, evidencing the point at which a two phase system is achieved. The point where this occurs, however, depends upon the rate at which the system is heated, slower heating rates shifting the curve of the phase diagram downward in temperature. Furthermore, and as previously indicated, the molecular weights of the polymer components making up the system play a part in determining the point at which the two phases appear.

FIG. 1 shows a phase diagram for a polycarbonate/polymethylmethacrylate composition obtained by plotting cloud points arrived at by heating system compositions at the rate of 2° C. per minute. From the diagram, it is clear that the LCST depends upon the relative amounts of the two components present, and that two phases are possible only within certain compositional limits, which vary from system-to-system but which can be determined experimentally.

In determining the LCST point for a particular composition of a specific system, it is simply necessary to determine the cloud point at that composition for a variety of heating rates, and thereafter, to extrapolate the curve so obtained to a zero heating rate to obtain the LCST for the composition.

Figure 2:
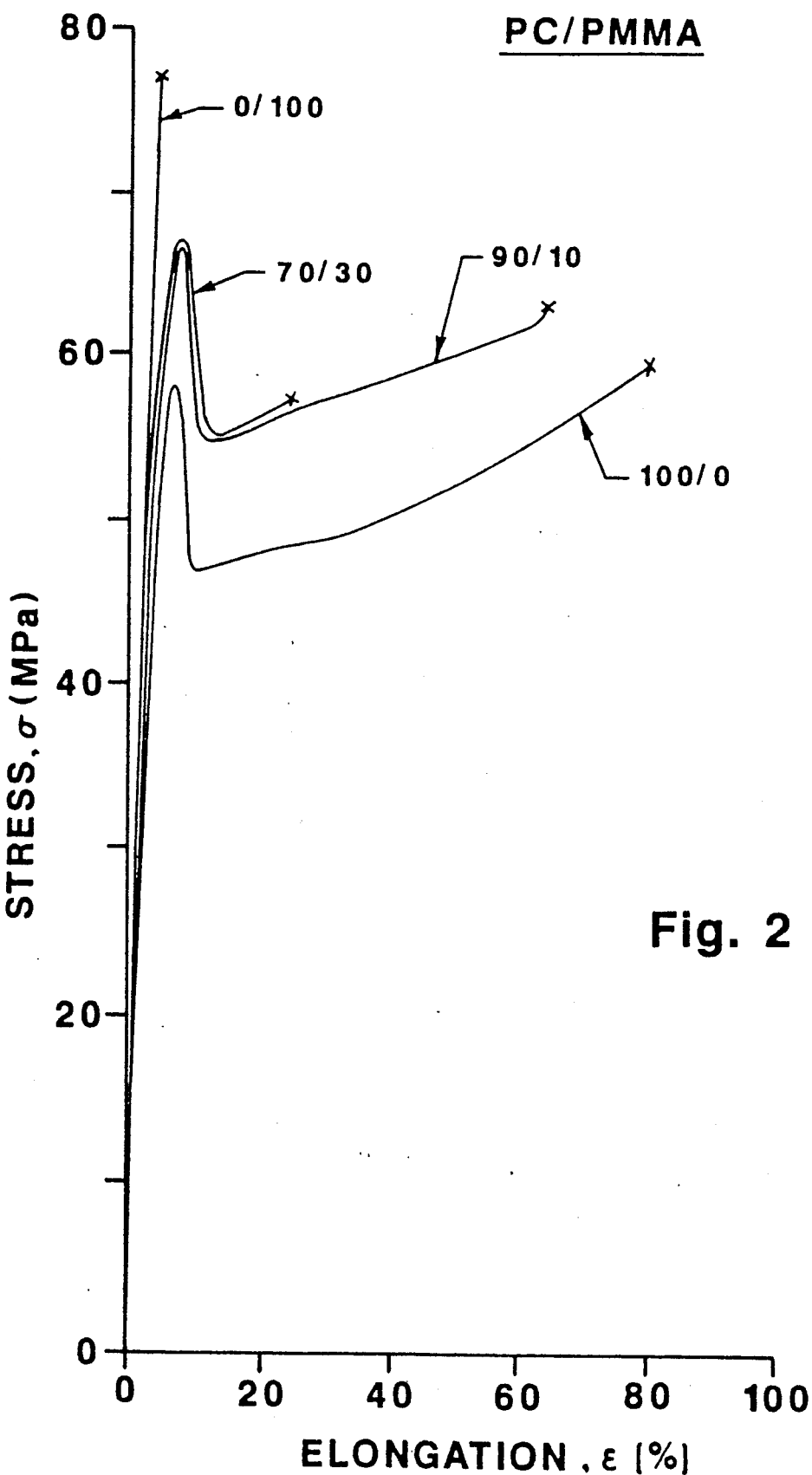
FIG. 2 shows a plot comparing the stress-strain curves of single-phase polycarbonate/polymethylmethacrylate blend compositions with those of pure polycarbonate and polymethylmethacrylate materials.

FIG. 2 shows a plot comparing the stress-strain curves of a single phase polycarbonate/polymethylmethacrylate blend composition with those of pure polycarbonate and polymethylmethacrylate materials. The stress-strain curve plots the stress, sigma, in mega-Pascals. against the elongation, epsilon, in percent. The two component compositions shown were prepared by dissolving the polycarbonate and polymethylmethacrylate in tetrahydrofuran to produce a polymer concentration of from about 2 to 5 weight percent polymer. After evaporation of the solvent, the film thus obtained was heated to about 40 to 50 degrees C. above the glass transition temperature of the respective compositions, a point substantially below the LCST of the mixture, and compression molded to produce transparent specimens which exhibited a single glass transition temperature, indicative of a single phase composition. Samples representing the various compositions shown in FIG. 2 where thereafter subjected to testing with a Model T-10 Monsanto tensile tester at a cross-head speed of three mm per minute. As can be seen from the Figure, the pure PC exhibited a typical ductile behavior, as indicated by the substantial elongation prior to break, while the pure PMMA showed no yield point, demonstrating its brittle character. Both of the single phase compositions, i.e., the 70/30 and the 90/10, show varying degrees of elongation; however, the elongations of both were inferior compared to the pure PC, demonstrating that the toughness of the latter is superior to both of the blends.

Figure 3:
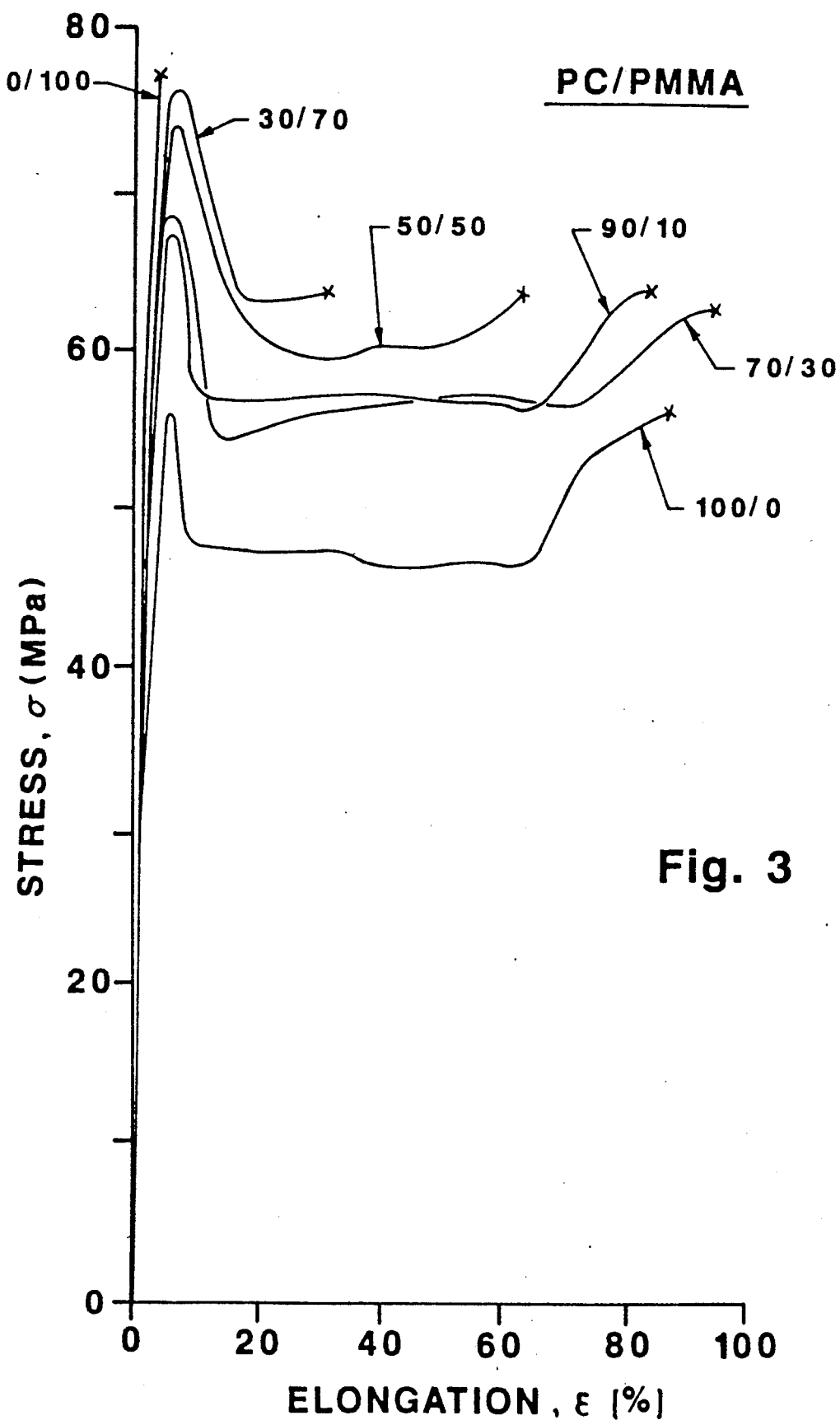
FIG. 3 shows a plot of stress-strain curves comparing various two-phase polycarbonate/polymethylmethacrylate blend compositions, but without spinodal structure, with curves of the pure components.

FIG. 3 shows a plot of stress-strain curves comparing various two-phase polycarbonate/polymethylmethacrylate blends, but without spinodal structure, relative to curves of the pure components. The compositions of FIG. 3 were prepared by combining dried polycarbonate and polymethylmethacrylate pellets in a Custom Science Inc. "Mini Max Molder" apparatus, where they were mixed at 265° C., a temperature above the LCST of the system. The blends resulted in structures having a pearlescence appearance, indicating a two-phase structure, although non-spinodal structure was confirmed by electromicrograph examination. Tensile test samples in the form of cylindrical dumb-bell shaped specimens were subsequently prepared from the compositions by injection molding. As in the case of the similar samples of FIG. 2, the specimens were subjected to tensile testing at room temperature, While the 30/70 and 50/50 composition curves showed inferior elongation at break, compared to the pure polycarbonate sample, both the 90/10 and 70/30 compositions exhibited improved properties, including tensile strength, yield strength, and plateau modulus, without the sacrifice of elongation at break. Consequently, the area under the stress-strain curve, indicative of toughness, was greater for the latter two compositions, than for the pure polycarbonate. The improvement appears to confirm the toughness enhancement resulting from the transition from brittle to ductile phases reported by K. K. Koo et al., Polym. Eng. Sci., 27,741 (1985). Those authors attributed such improved phenomenon to compositions in which the dispersed phase was smaller than 1 micron.

Figure 4:
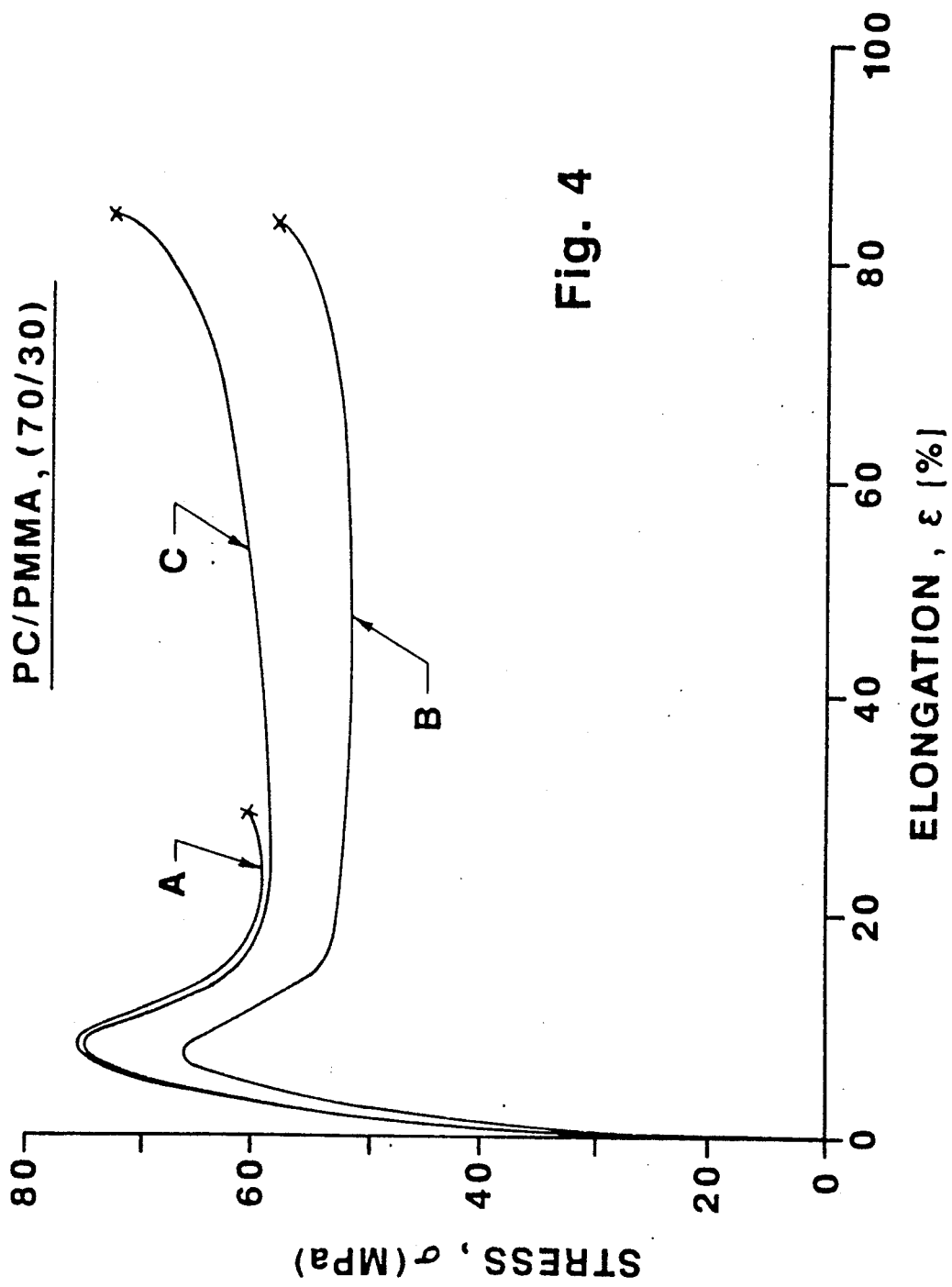
FIG. 4 illustrates a plot of stress-strain curves comparing various polycarbonate/polymethylmethacrylate blends, including a single-phase blend, and several two-phase blends, one with spinodal structure, and one without.

FIG. 4 illustrates a plot of stress-strain curves comparing various polycarbonate/polymethylmethacrylate blends including a single-phase blend, and several two-phase blends, one with spinodal structure, and one without. Referring to the Figure, curve A illustrates the curve of a single-phase specimen; curve B a two-phase specimen with no spinodal structure; while curve C plots the properties of a two-phase composition with spinodal structure. The composition reflected by curve A was prepared by the solvent casting system previously described, below the LCST temperature, while curve B reflects a test specimen prepared as described in connection with the non-spinodal, two-phase compositions associated with FIG. 3. Curve C reflects the testing of a specimen in which a single phase cast film was prepared as previously described, but which was thereafter melt-mixed at 265° C., a temperature above the LCST of the composition, in a "Mini Max" molder for two minutes prior to being injection molded to obtain cylindrical dumb-bell shaped test specimens. In this case, and exemplifying the technique of the invention, in passing the LCST, the blend composition crosses over the phase boundary from the single to the biphase region. The mixing time was limited to avoid excessive domain sizes, and stabilization of the existing spinodal morphology was accomplished by the injection molding process, during which the temperature was dropped below the LCST.

As can be seen from FIG. 4, curve B, illustrative of the two-phase composition without spinodal characterization, provides physical characteristics superior to that of curve A, the single-phase composition. Curve C, however, exemplifying the two-phase composition with spinodal morphology, demonstrates still superior physicals as a result of the interconnecting network at the phase boundaries.

In a further experiment, polycarbonate, in combination with a styrene-acrylonitrile copolymer, SAN, was dissolved in methylene chloride, following which the polymer solution was coated on glass and the solvent evaporated. The process, conducted below about 50° C., resulted in a quantity of clear film.

The film was subsequently melt-mixed in a Mini-Max molder, at a temperature above the LCST, 250°–280° C., depending on the composition of the blend being mixed, for about three minutes. The melt-blended compositions were then injected molded into dumbbell-shaped specimens, the test portion of which had a diameter of 1.6 mm, and a length of 7.9 mm. Again, the specimens were tested on a Model T-10 Monsanto tensile tester at a cross-head speed of 3 mm per minute at room temperature.

Figure 5:
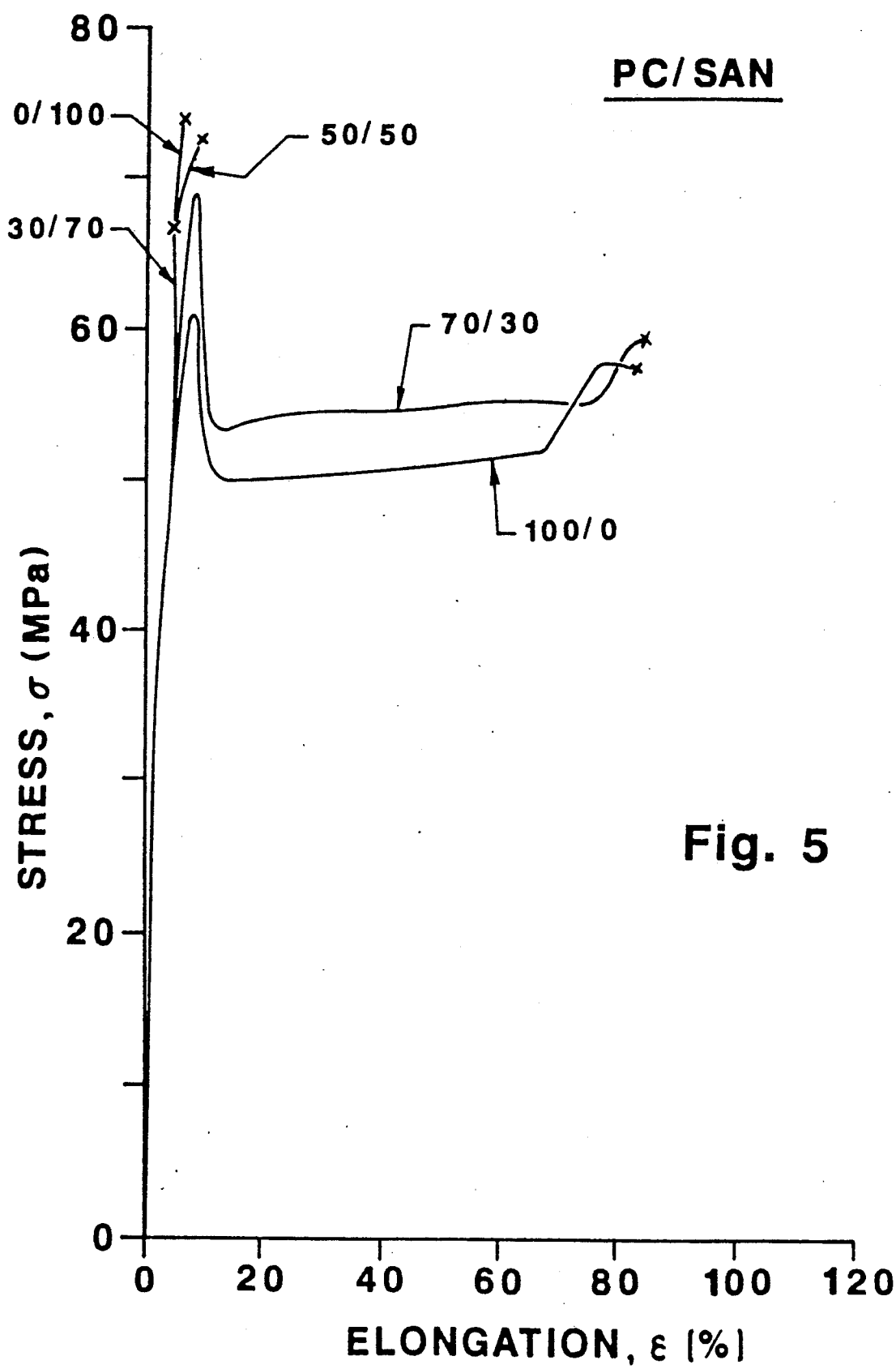
FIG. 5 shows a plot of stress-strain curves comparing various polycarbonate/styrene-acrylonitrile blend compositions with curves of the pure components.

FIG. 5 shows a plot of the stress-strain curves comparing the various polycarbonate/styrene-acrylonitrile blends with curves of the pure components. While several of the compositions, those with higher concentrations of the brittle styrene-acrylonitrile copolymer, show inferior physical results, the experiment is significant in that the 70/30 composition shows significantly superior properties, relative to the pure polycarbonate polymer. The experiment also illustrates the desirability of optimizing a particular system of interest.

The most suitable polymers for preparing two-component polymer compositions with morphology resulting from spinodal decomposition may broadly be described as compositions incorporating "brittle" polymers, i.e., those which demonstrate little or no yield behavior when subjected to tensile testing, with "ductile" polymers, which latter do show substantial yield behavior. Brittle polymers are exemplified by thermotropic liquid crystalline polymers, while the ductile polymers include thermoplastics, preferably the polycondensates. Among suitable systems may be mentioned relatively ductile materials such as polycarbonates and substituted polycarbonates, as well as equivalent materials; in combination with brittle polymers such as, for instance, polymethylmethacrylate, styrene-acrylonitrile copolymers, and others. Other polymer combinations which exemplify the process described herein include, for example, brittle copolymers of polyethylene terephthalate reacted with poly-p-hydroxybenzoic acid, in combination with a polyether imide, and others. The combination of a polycarbonate polymer in conjunction with polymethylmethacrylate, however, constitutes a preferred embodiment of the invention.

As previously indicated, the molecular weight of the polymers employed has a bearing on the temperatures and other processing variables associated with the invention. In the case of polycarbonates employed in combination with polymethylmethacrylates, the polycarbonates will usually have a weight average molecular weight of from about 20,000 to about 60,000. The molecular weight of the polymethylmethacrylates on the other hand, will typically be from about 80,000 to 500,000. As a general rule, it has been found that the larger the difference between the molecular weight of the ductile, relative to the brittle polymer, the lower the LCST of the system will be.

The polymer compositions characterized by the spinodal morphology described, are useful in producing plastics in which optical clarity is not a primary consideration. Among such uses may be mentioned the fabrication of automobile parts, impact resistant housing, fiber-reinforced plastics, and other applications where high-impact resistance and toughness characteristics are necessary.

While in accordance with the patent statutes, a preferred embodiment and best mode has been presented, the scope of the invention is not limited thereto, but rather as measured by the scope of the attached claims.

What is claimed is:

1. A process for producing two-phase, solid, polymeric alloy compositions from blends of polycarbonate and polymethylmethacrylate, present in relative amounts other than those in which said polymers form a single phase at all temperatures above their glass transition temperatures, and characterized by interconnected structural morphology dependent upon spinodal decomposition comprising:

preparing a polymeric composition exhibiting a single phase, and having an single glass transition temperature, from a combination of said polymers;

heating said single phase composition at least to a first temperature, above its glass transition temperature for a time sufficient to form interconnected two-phase material the spinodal domains of which have a size of less than about 1 micron having two glass transition temperatures, and thereafter substantially stabilizing the two-phase morphology of said two-phase material by lowering its temperature to a second temperature below the lower of its two glass transition temperatures.

2. A process according to claim 1 in which said blend comprises a blend of a polycarbonate and a polymethylmethacrylate, the weight ratio of the former to the latter being in the range of from about 20/80 to about 80/20.

3. A process according to claim 1 in which said single phase composition is prepared by dissolving said polymers in a mutual solvent, and subsequently separating said composition from said solvent.

4. A process according to claim 1 in which said stabilization is achieved by forming said two-phase material into the shape of a desired fabricated article simultaneously with the lowering of its temperature.

5. A process according to claim 1, wherein said first temperature is above the lower critical solution temperature of said alloy composition.

6. Polymeric alloy compositions prepared by the process of claim 1.

* * * * *